United States Patent
Okabayashi et al.

(10) Patent No.: US 8,565,923 B2
(45) Date of Patent: Oct. 22, 2013

(54) ROBOT

(75) Inventors: Miwa Okabayashi, Kawasaki (JP);
Keiju Okabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 12/654,169

(22) Filed: Dec. 11, 2009

(65) Prior Publication Data

US 2010/0094463 A1   Apr. 15, 2010

Related U.S. Application Data

(63) Continuation of application No. PCT/JP2007/062130, filed on Jun. 15, 2007.

(51) Int. Cl.
G05B 15/00 (2006.01)
G05B 19/00 (2006.01)

(52) U.S. Cl.
USPC .......................................... 700/264; 700/245

(58) Field of Classification Search
None
See application file for complete search history.

(56) References Cited

U.S. PATENT DOCUMENTS

| | | | | |
|---|---|---|---|---|
| 5,378,969 A * | 1/1995 | Haikawa | ................. | 318/568.12 |
| 5,530,791 A * | 6/1996 | Okabayashi | .................. | 700/255 |
| 5,617,335 A * | 4/1997 | Hashima et al. | ......... | 340/815.57 |
| 6,130,626 A * | 10/2000 | Kane et al. | .................... | 340/905 |
| 6,336,072 B1 | 1/2002 | Takayama et al. | | |
| 6,438,456 B1 * | 8/2002 | Feddema et al. | .............. | 700/245 |
| 6,697,731 B2 | 2/2004 | Takayama et al. | | |
| 6,748,316 B2 | 6/2004 | Takayama et al. | | |
| 6,836,701 B2 * | 12/2004 | McKee | .......................... | 700/245 |
| 7,120,519 B2 * | 10/2006 | Okabayashi et al. | ......... | 700/254 |
| 7,218,994 B2 * | 5/2007 | Kanda et al. | ................... | 700/245 |
| 7,304,581 B2 * | 12/2007 | Miyazaki et al. | .......... | 340/573.1 |
| 7,330,776 B1 * | 2/2008 | Norman et al. | ............... | 700/245 |
| 2001/0022859 A1 * | 9/2001 | Okabayashi et al. | ......... | 382/278 |
| 2001/0056443 A1 | 12/2001 | Takayama et al. | | |
| 2002/0099499 A1 | 7/2002 | Takayama et al. | | |
| 2002/0103597 A1 | 8/2002 | Takayama et al. | | |
| 2005/0029342 A1 | 2/2005 | Sugimoto et al. | | |
| 2005/0071047 A1 * | 3/2005 | Okabayashi et al. | ......... | 700/245 |
| 2005/0165508 A1 * | 7/2005 | Kanda et al. | ................... | 700/245 |

FOREIGN PATENT DOCUMENTS

| | | |
|---|---|---|
| JP | 6-131046 | 5/1994 |
| JP | 11-27205 | 1/1999 |
| JP | 2000-215211 | 8/2000 |

(Continued)

OTHER PUBLICATIONS

Japanese Notification of Reasons for Refusal for related Japanese Patent Application No. 2009-519125, mailed Jul. 5, 2011.

(Continued)

*Primary Examiner* — Bhavesh V Amin
(74) *Attorney, Agent, or Firm* — Staas & Halsey LLP

(57) ABSTRACT

A robot includes: a moving mechanism; a position recognition section that recognizes a current position of the robot within a guide zone having at least one guide location; and a movement control section that moves the robot to each of guide locations in the guide zone by using the moving mechanism, while causing the position recognition section to recognize the current position. The robot further includes a transmission section that transmits, every time the robot moves to each of the guide locations, contents information corresponding to the guide location to a mobile receive terminal held by a person to be guided near the robot.

3 Claims, 7 Drawing Sheets

(56) References Cited

FOREIGN PATENT DOCUMENTS

| | | |
|---|---|---|
| JP | 2002-374217 | 12/2002 |
| JP | 2003-50559 | 2/2003 |
| JP | 2003-91678 | 3/2003 |
| JP | 2003-241833 | 8/2003 |
| JP | 2005-161486 | 6/2005 |
| JP | 2005-172879 | 6/2005 |
| JP | 2005-289307 | 10/2005 |
| JP | 2006-350137 | 12/2006 |

OTHER PUBLICATIONS

International Search Report for PCT/JP2007/062130, mailed Jul. 17, 2007.

English Translation of the International Preliminary Report on Patentability mailed Dec. 30, 2009 in corresponding International Patent Application PCT/JP2007/062130.

* cited by examiner

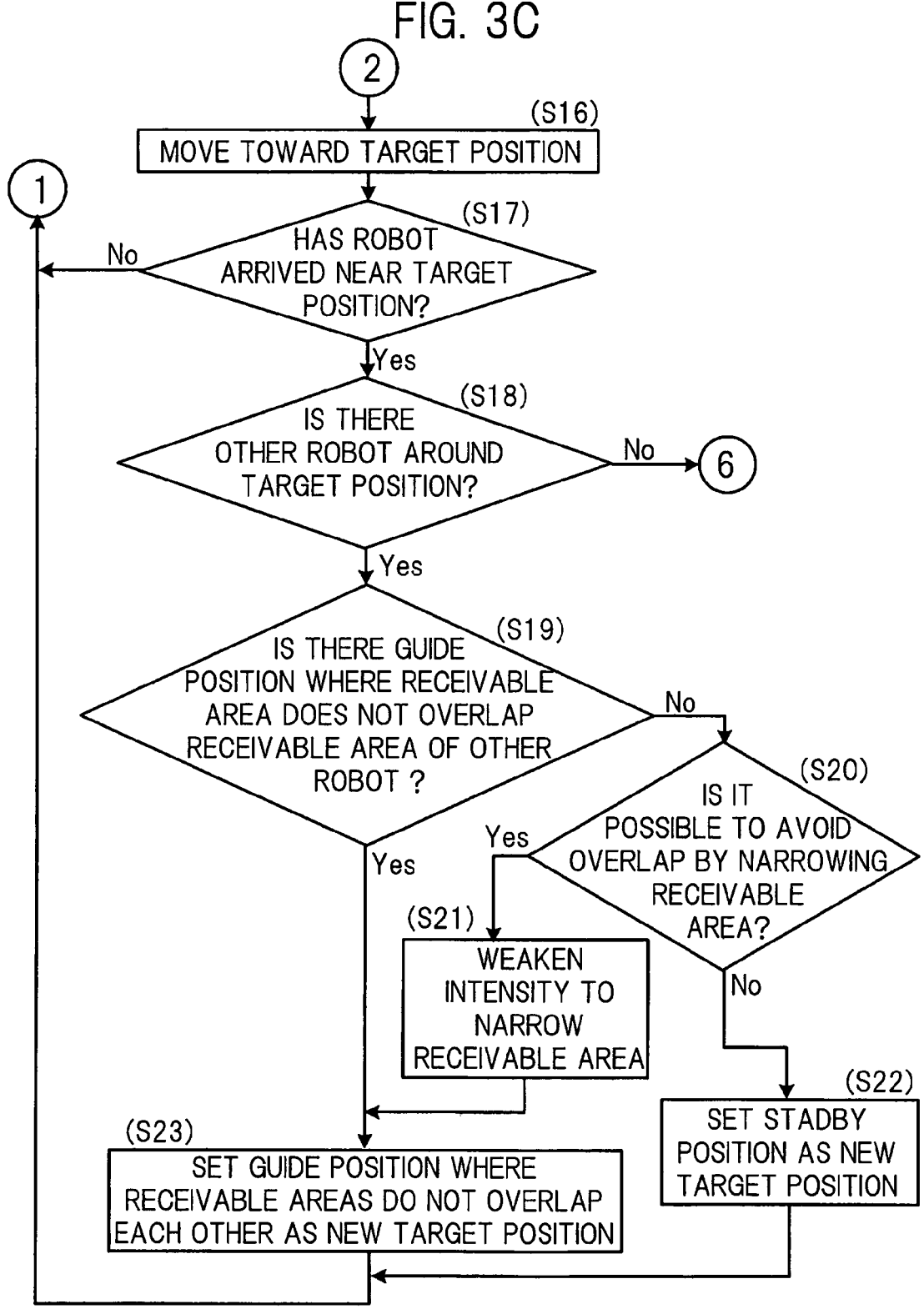

ROBOT

CROSS-REFERENCE TO RELATED APPLICATION

This is a continuation application of PCT/JP2007/062130, filed on Jun. 15, 2007.

FIELD

The embodiment discussed herein is related to a robot that includes a moving mechanism and guides a person having a mobile receive terminal and moving within a guide zone that includes at least one guide location.

BACKGROUND

With scientific advances in late years, various robots have been developed, and there are a growing number of situations where a robot performs an activity that is used to be carried out by a human. In particular, a simple activity required to repeat steps by following a predetermined procedure is performed by a robot more precisely than a human and thus, a robot is often used to carry out such a simple activity. In recent years, since computer technology has been applied to robotics, there have appeared robots capable of performing activities in accordance with complicated algorithms. Therefore, robots have been used to carry out not only simple activities but also complicated advanced activities. As a robot capable of performing an advanced activity, there is known, for example, a robot with an autonomous moving function and the function of recognizing the current position of the robot while moving. As one of this type of robot, there is a robot that displays, when a location is designated as a destination by a customer to be guided, a path from the current position to the location and information about the location on a display screen, thereby guiding the customer (for example, see Japanese Patent Laid-open Publications No. 2003-050559 and No. 2005-172879).

Incidentally, in a meeting place where a large number of people gather such as a huge exhibition, it is necessary to guide two or more customers at a time at each location in the meeting place such as the display spot of each exhibit. Meanwhile, an autonomously movable robot such as those described in Japanese Patent Laid-open Publications No. 2003-050559 and No. 2005-172879 has a display screen whose size is limited to achieve the sufficient autonomous movement of the robot and therefore, when there are a large number of customers to be guided, the display screen does not always allow all the customers to sufficiently view the contents on the display screen. Thus, further efforts are desired so that the robot acts as a guide sufficiently.

SUMMARY

According to an aspect of the invention, a robot includes:
a moving mechanism;
a position recognition section that recognizes a current position of the robot within a guide zone having at least one guide location;
a movement control section that moves the robot to each of guide locations in the guide zone by using the moving mechanism, while causing the position recognition section to recognize the current position; and
a transmission section that transmits, every time the robot moves to each of the guide locations, contents information corresponding to the guide location to a mobile receive terminal held by a person to be guided near the robot.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A-3D are diagrams that illustrate a flowchart that represents actions of the robot illustrated in FIG. 1 at the time of guiding the customers.

DESCRIPTION OF EMBODIMENT

An embodiment of the present invention will be described below.

Figure 1:
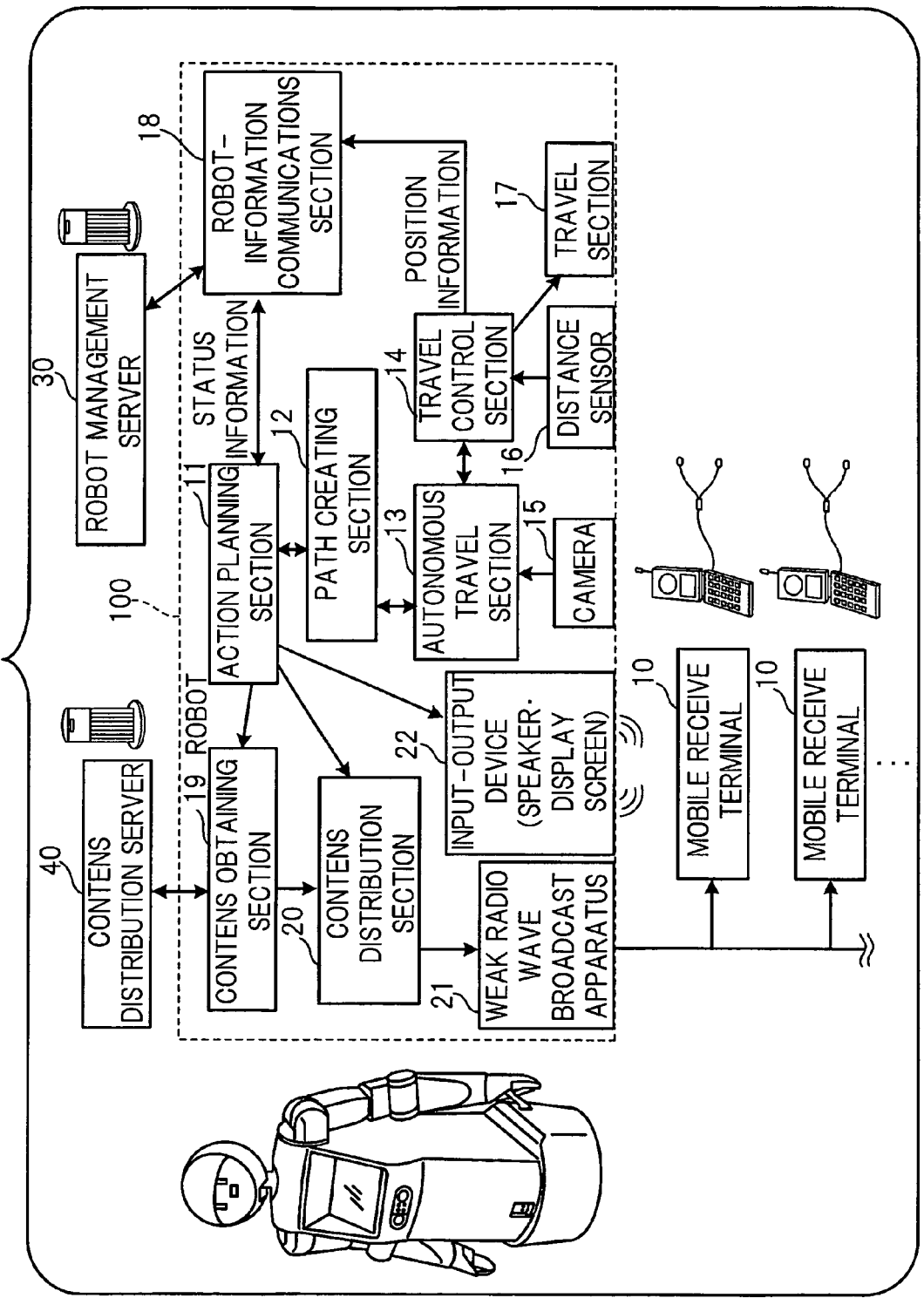
FIG. 1 is a diagram that illustrates a robot serving as one embodiment of the present invention and a guide system for guiding a customer having a mobile receive terminal by using the robot.

FIG. 1 is a diagram that illustrates a robot 100 serving as one embodiment of the present invention and a guide system for guiding a customer having a mobile receive terminal 10 by using the robot.

This guide system is used in an exhibition where exhibits are displayed. In this system, while moving among exhibits with customers to be guided in the exhibition, the robot 100 guides the customers by providing the customers with information (contents) on the exhibits. This guide system uses two or more robots 100 to guide a group of customers around each of the robots 100. All the robots 100 are of the same type and thus, appearance and schematic structure of a single representative robot 100 are illustrated in FIG. 1 and the illustration of the remaining robots 100 is omitted. As illustrated in FIG. 1, the guide system includes: the robot 100; a robot management server 30 that communicates with the robot 100 to manage the action status of the robot 100; a contents distribution server 40 that delivers, to the robot 100 through a wireless LAN, contents to be provided for customers to be guided; and the mobile receive terminal 10 held by each of the customers to be guided by the robot 100. The mobile receive terminal 10 includes a display screen for displaying images and an earphone connected to the mobile receive terminal 10. When a radio signal that represents information (contents) about an exhibit is transmitted from the robot 100 to the mobile receive terminal 10, the mobile receive terminal 10 displays an image related to the contents represented by the radio signal on the display screen and outputs voice through the earphone. The customer to be guided receives a guiding service about the exhibit by looking at the image displayed on the display screen and listening to the voice through the earphone. The radio signal transmitted by the robot 100 is received only by the mobile receive terminal 10 present within a range of 2 m to 3 m from the robot 100 serving as a transmission source, and is a weak radio wave that is low in intensity and used for broadcast. In the following description, an area around the robot 100, within which the mobile receive terminal 10 is able to receive a weak radio wave transmitted from the robot 100, is referred to as a receivable area of the robot 100. Therefore, in this guide system, only customers who are in the receivable area of the robot 100 receive the contents provided by the robot 100. Here, the receivable area of the robot 100 may be increased (reduced) by making the intensity stronger (weaker) and also, the robot 100 may transmit weak radio waves through two or more channels at mutually different frequencies and transmit arbitrary contents using any channel. Further, the robot 100 may transmit different contents at the same time by using these two or more channels. The intensity is changed and the two or more channels are used differently depending on the situation, which will be described later. Incidentally, as a system that provides a destination with contents according to a channel by using radio signals as described above, there is, for example, a contents distribution system based on "one-segment broadcasting."

Subsequently, the structure of the robot 100 will be described. The robot 100 includes: an action planning section 11 that establishes a target position as a travel destination of the robot 100 and determines the contents of an action to be performed at the target position; a path creating section 12 that creates a path to the target position in response to an instruction from the action planning section 11; and an autonomous travel section 13 that controls the autonomous travel of the robot 100 so that the robot 100 moves along the path created by the path creating section 12 to the target position. The path creating section 12 has information on a map that indicates the locations of objects such as exhibits in the exhibition. The above-described creation of the path is to determine how the robot 100 should move to the target position on the map. Here, the robot 100 is a robot that moves by rotating wheels using a motor. In FIG. 1, the wheels and the motor combined are represented by a travel section 17. The control of the moving direction and moving speed of the robot 100 is carried out through the control of the travel section 17 by a travel control section 14. The travel control section 14 controls the travel section 17 based on an instruction provided by the autonomous travel section 13 and a detection result obtained by an ultrasonic sensor (distance sensor) 16 that detects an obstacle that exists in the moving direction of the robot 100. Also, the robot 100 includes a camera 15 that photographs a state around the robot 100. The autonomous travel section 13 determines the current position of the robot 100 on the map based on image data obtained through shooting by the camera 15, and outputs data representing the current position to the action planning section 11 and a robot-information communications section 18. Meanwhile, the data representing the travel direction and the moving speed of the robot 100 determined by the travel control section 14 is output to the action planning section 11 and the robot-information communications section 18. The current movement of the robot 100 is represented by the data on the current position of the robot 100 and the data on the travel direction and moving speed of the robot 100 output to the action planning section 11 and the robot-information communications section 18, which will be referred to collectively as position information in the following description. The position information is transmitted to the robot management server 30 from the robot-information communications section 18. Also, information about the current action of the robot 100 and information about the intensity of weak radio wave and the channel used by the robot 100 are transmitted from the robot-information communications section 18 to the robot management server 30. Further, the robots 100 are provided with an order of precedence (priorities) to be followed at the time of movement, which will be described later, and information about the priority of the robot 100 also is transmitted to the robot management server 30. In the following description, the information about the priority and the information about the intensity of weak radio wave and the channel combined are referred to collectively as status information. Here, the position information and the status information of the respective other robots 100 also are transmitted to the robot management server 30 from these other robots 100, and the robot management server 30 transmits the position information and the status information of these other robots 100 to the robot-information communications section 18. By doing so, the action planning section 11 is always able to obtain the position, the travel direction, the moving speed, the contents of activity, the intensity and channel of a weak radio wave in use, and information about the priority of each of the other robots 100.

Further, the robot 100 includes a contents obtaining section 19. The contents obtaining section 19 sends, to the contents distribution server 40, a request for the transmission of the contents based on an instruction provided by the action planning section 11, and obtains the contents transmitted in response to the request. For the purpose of guiding customers around the robot 100 by explaining an exhibit, a contents distribution section 20 gives an instruction to a weak radio-wave broadcast device 21 so that the weak radio-wave broadcast device 21 transmits the weak radio wave representing the contents to the mobile receive terminal 10 of each customer.

Here, the combination of the action planning section 11, the path creating section 12, the autonomous travel section 13 and the travel control section 14 is an example of the movement control section of the present invention. Further, the combination of the action planning section 11 and the robot-information communications section 18 is an example of the position recognition section of the present invention. Furthermore, the combination of the action planning section 11, the contents obtaining section 19, the contents distribution section 20 and the weak radio-wave broadcast device 21 is an example of the transmission section of the present invention. Also, the combination of the action planning section 11 and the robot-information communications section 18 is an example of each of the channel determination section and the overlap detection section of the present invention.

Subsequently, actions of the robot 100 at the time of guiding customers will be described. Here, there will be described a situation in which the robots 100 guide the customers by visiting each display spot in an exhibition where three exhibits are displayed, and the actions of one of the robots 100 will be described as an example. Incidentally, the robots 100 visit each display spot while accompanied by the respective groups of customers, thereby guiding the customers.

Figure 2:
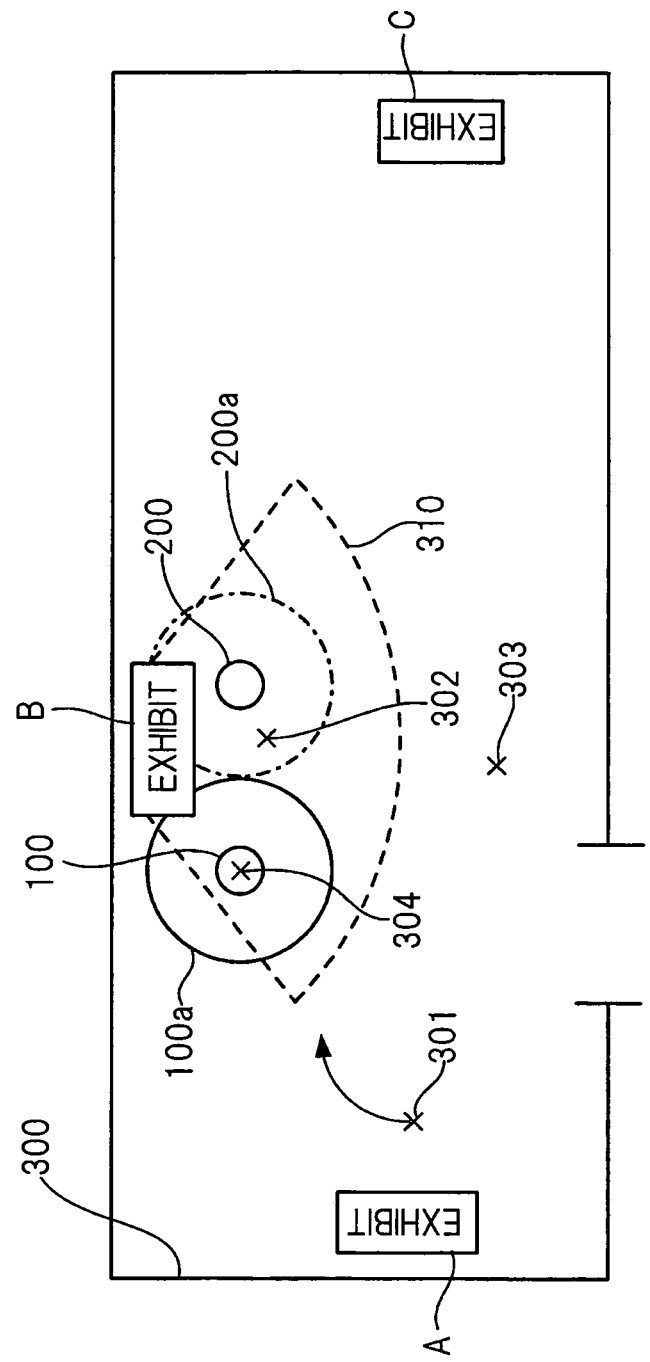
FIG. 2 is a schematic diagram of an exhibition where the robot illustrated in FIG. 1 guides customers.
Figure 3A:
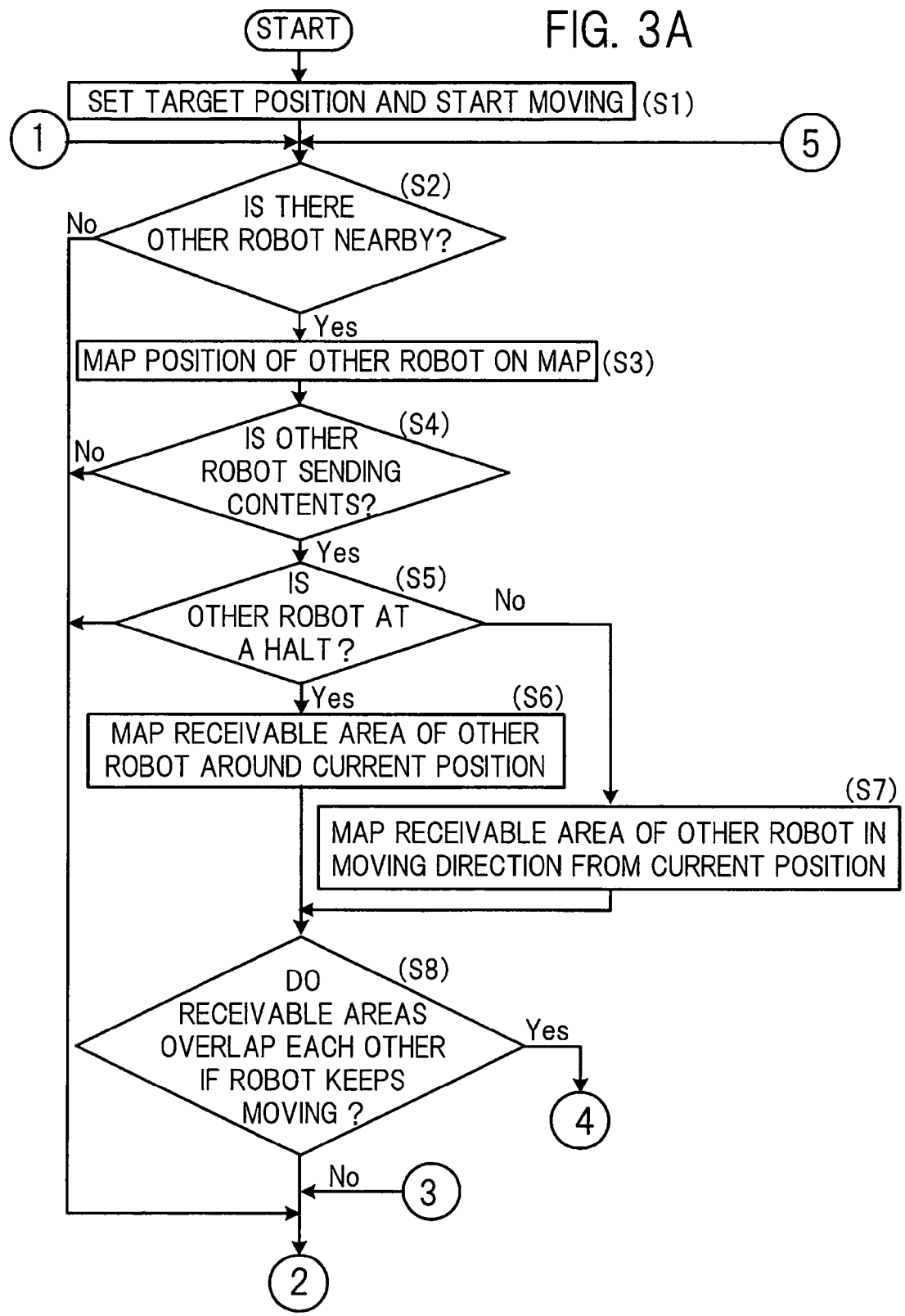
Figure 3B:
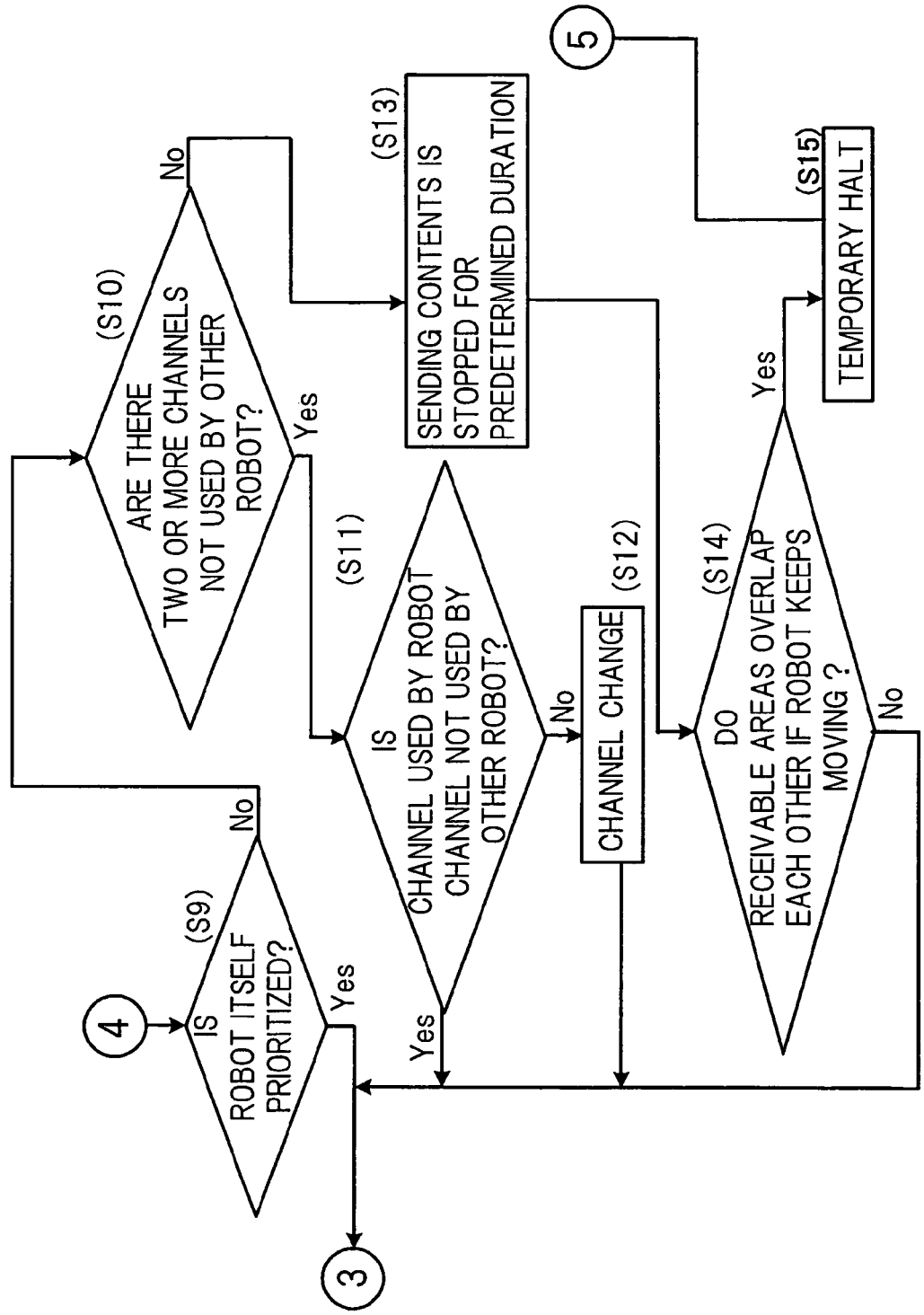
Figure 3D:
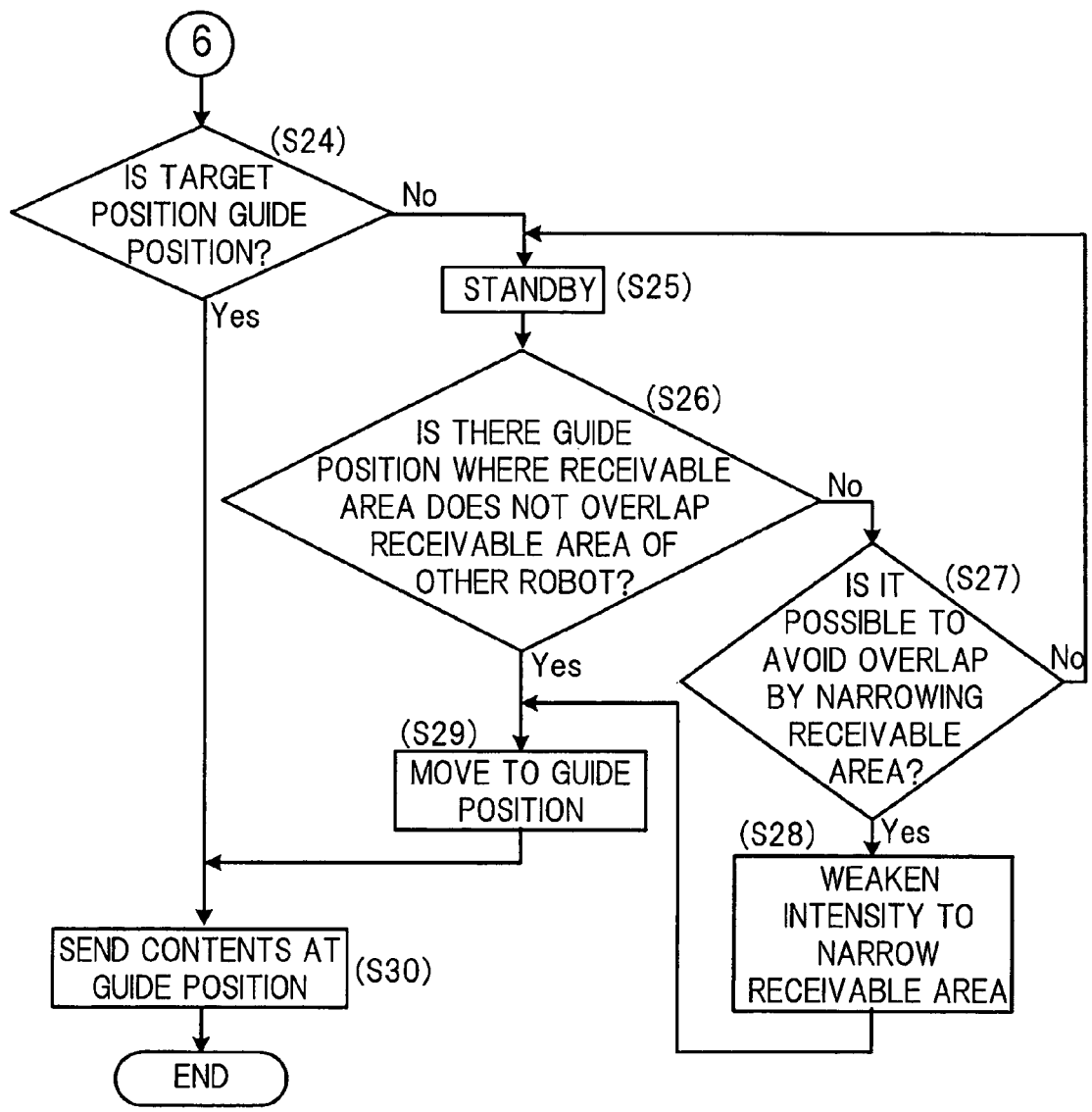

FIG. 2 is a schematic diagram of an exhibition 300 where the robot 100 illustrated in FIG. 1 guides customers, and FIGS. 3A-3D are diagrams that illustrate a flowchart that represents actions of the robot 100 illustrated in FIG. 1 at the time of guiding the customers.

As illustrated in FIG. 2, three exhibits A, B and C are displayed in the exhibition 300, and the robot 100 whose actions will be described guides the customers while visiting the three exhibits A, B and C in this order. Here, the exhibition 300 is an example of the guide zone of the present invention. The following description will be provided by referring to the flowchart in FIGS. 3A-3D and taking, as an example, a series of actions of the robot 100 that moves, after finishing the explanation of the exhibit A at a guide position 301, from the guide position 301 for the exhibit A to the exhibit B in a direction indicated with an arrow in FIG. 2 to explain the exhibit B in the end.

In order to let the robot 100 provide the customers with a guiding service for the exhibit B, at first, the action planning section 11 illustrated in FIG. 1 sets a guide position 302 for the exhibit B as a target position of the robot 100. Subsequently, the path creating section 12 creates a traveling path of the robot 100 for allowing the robot 100 to move to the set target position, and the robot 100 starts moving along the path under the control of the autonomous travel section 13 (step S1 in FIG. 3A). Concurrently with the start of the movement, the contents obtaining section 19 sends, to the contents distribution server 40, a request for the transmission of the contents of the exhibit B based on an instruction provided by the action planning section 11, and obtains the contents transmitted in response to the request. Subsequently, the transmission of the weak radio wave to the mobile receive terminal 10 of each of the customers around the robot 100 begins.

By this transmission of weak radio wave, the robot 100 simultaneously transmits, using two of the channels, the contents of the exhibit B for adults and the contents of the exhibit B for children made easy to understand for children by modifying the contents for adults. The customers are allowed to select either of these channels through the setting of their mobile receive terminals 10. Before starting the transmission of the weak radio wave, the robot 100 announces selectable channels to the customers through an input-output device (speaker and display screen) 22 of the robot 100 illustrated in FIG. 1, by using voice and image. Here, the contents transmitted by the robot 100 on the move form a brief explanation of the exhibit B, and the customers to be guided receive the brief explanation through the earphone of the mobile receive terminal 10. As will be described later, in a state in which the robot 100 is at a halt and the customers are able to view the display screens of the mobile receive terminals 10 without haste, the robot 100 gives a detailed description about the exhibit B by using both images and voice through the mobile receive terminals 10.

Also, the action planning section 11 in FIG. 1 recognizes the current position of the robot 100 and the moving direction and moving speed of the robot 100 at the current position of the robot 100, based on the position information provided by the autonomous travel section 13 and the travel control section 14. The action planning section 11 then maps the current position of the robot 100 on the map possessed by the path creating section 12. Further, the action planning section 11 determines a receivable area (hereinafter referred to as expected receivable area) after a predetermined time (e.g., several seconds) based on the current moving direction and moving speed of the robot 100 and the intensity of the weak radio wave currently used by the robot 100, and maps the position of that area on the map. When the robot 100 is currently at a standstill, the expected receivable area is, for example, a receivable area whose center is at the current position of the robot 100. On the other hand, when the robot 100 is currently moving, the expected receivable area is a receivable area whose center is at a position shifted in the current moving direction from the current position, by a distance obtained through multiplication of the current moving speed by the predetermined time. The mapping of the current position and the mapping of the expected receivable area are constantly carried out during the guiding by the robot 100 and overwritten with the new current position and expected receivable area.

Also, from the robot management server 30 illustrated in FIG. 1, the position information and the status information of the other robots 100 illustrated in FIG. 2 are constantly sent to the robot-information communications section 18 of the robot 100. When movement to the target position is started, the action planning section 11 determines whether there is other robot 100 near the robot 100 based on these pieces of information (step S2). Specifically, the action planning section 11 determines whether there is other robot 100 within a predetermined distance from the robot 100, based on the current position of the robot 100 and the current position of the other robot 100. In the following description, in order to clearly distinguish the robot 100 whose actions are described and the other robot 100 from each other, the other robot 100 is referred to as other robot 200. When the other robot 200 is not near the robot 100 (step S2: No), the movement of the robot 100 to the target position is continued under the control of the autonomous travel section 13 (step S16). When the other robot 200 is near the robot 100 (step S2: Yes), the action planning section 11 illustrated in FIG. 1 maps the position of the other robot 200 on the map possessed by the path creating section 12 (step S3), and then determines whether the other robot 200 is transmitting the contents (step S4). When the other robot 200 is not transmitting the contents (step S4: No), the movement of the robot 100 to the target position is continued under the control of the autonomous travel section 13 (step S16). When the other robot 200 is transmitting the contents (step S4: Yes), the action planning section 11 maps, based on the current moving speed and moving direction of the other robot 200 as well as based on the intensity of the weak radio wave currently used by the other robot 200 indicated by the status information of the other robot 200, an expected receivable area of the other robot 200, like the mapping of the expected receivable area of the robot 100. In other words, when the other robot 200 is at a halt (step S5: Yes), the receivable area of the other robot 200, which area has its center at the current position of the other robot 200, is mapped on the map of the path creating section 12 (step S6). When the other robot 200 is not at a halt (step S5: No), the receivable area is mapped on the map of the path creating section 12 such that the center of the receivable area is at a position shifted from the current position of the other robot 200 in the moving direction, only by a distance obtained through multiplication of the current moving speed of the other robot 200 by the predetermined time (step S7). Subsequently, the action planning section 11 determines whether overlapping between the receivable area of the robot 100 and the receivable area of the other robot 200 occurs even if the robot 100 keeps moving on the current path (step S8). Specifically, the action planning section 11 makes this determination by checking whether there is an overlap between the mapped expected receivable area of the robot 100 and the mapped expected receivable area of the other robot 200.

Figure 4:
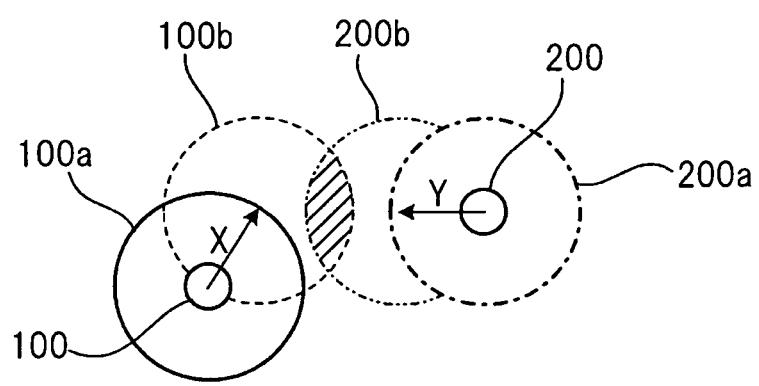
FIG. 4 is a diagram that illustrates the current positions and the expected receivable areas of two robots.

FIG. 4 is a diagram that illustrates the current positions and the expected receivable areas of the two robots.

FIG. 4 illustrates a situation in which the robot 100 moves in an X-direction in FIG. 4 and the other robot 200 moves in a Y-direction. The current receivable area 100a of the robot 100 is expected to shift to the expected receivable area 100b indicated with a dotted line as the robot 100 moves. On the other hand, the current receivable area 200a of the other robot 200 is expected to shift to the expected receivable area 200b indicated with a chain double-dashed line as the other robot 200 moves. The two expected receivable areas 100b and 200b overlap each other in a diagonally shaded area in FIG. 4. In the situation illustrated in FIG. 4, the action planning section 11 determines that overlapping between the receivable area of the robot 100 and the receivable area of the other robot 200 is likely to occur if the robot 100 keeps moving on the current path (step S8 in FIG. 2: Yes). On the other hand, when there is no overlap between the expected receivable areas, the action planning section 11 determines that even if the robot 100 keeps moving on the current path, overlapping between the receivable area of the robot 100 and the receivable area of the other robot 200 is unlikely to occur (step S8 in FIG. 2: No), and the robot 100 keeps moving toward the target position under the control of the autonomous travel section 13 (step S16).

In the guide system illustrated in FIG. 1, priorities are assigned to movements of the respective robots beforehand, so that in a situation where the respective receivable areas of two robots are likely to overlap each other if the two robots continue moving on the current paths, the robot with a lower priority moves to avoid an overlap between the receivable areas, and the robot with a higher priority keeps moving on the current path. The information about the priority is included in the status information of the robot and transmitted to each robot from the robot management server 30 illustrated in FIG. 1.

When determining in step S8 that overlapping between the receivable area of the robot 100 and the receivable area of the other robot 200 is likely to occur if the robot 100 keeps moving on the current path, the action planning section 11 subsequently determines that whether the priority of the robot 100 is higher than that of the other robot 200 (step S9). When it is determined that the priority of the robot 100 is higher than that of the other robot 200 (step S9: Yes), the robot 100 keeps moving on the current path to the target position under the control of the autonomous travel section 13 (step S16). When determining that the priority of the robot 100 is lower than that of the other robot 200 (step S9: No), the action planning section 11 subsequently determines whether there are two or more channels that are not used by the other robot 200 among the above-described channels (step S10). Here, the reason for determining whether there are two or more channels is that it is necessary to secure two channels for the purpose of transmitting the contents for adults and the contents for children at the same time. Also, although two or more channels are selectable by the robot 100, there is, for example, a situation where no channel not used by the other robot 200 is available at the time when the robot 100 encounters two or more other robots 200 having priorities higher than that of the robot 100 at a time. In this situation, "No" is selected in step S10. On the contrary, when there are a sufficient number of available channels, "Yes" is selected in step S10.

When there are channels not used by the other robot 200 (step S10: Yes), the action planning section 11 subsequently determines whether the channel currently used by the robot 100 is a channel not used by the other robot 200 (step S11). When the channel currently used by the robot 100 is a channel not used by the other robot 200 (step S11: Yes), the robot 100 keeps traveling on the current path toward the target position (step S16). When the channel currently used by the robot 100 is a channel used by the other robot 200 (step S11: No), interference between weak radio waves is expected to occur in the diagonally shaded area where the receivable area of the robot 100 and the receivable area of the other robot 200 overlap each other as illustrated in FIG. 4, if use of the channel is continued. Therefore, the action planning section 11 causes the contents distribution section 20 in FIG. 1 to stop transmitting the weak radio wave for a time, and selects one of the channels not used by the other robot 200. The action planning section 11 then instructs the customers to change the receiving channel of the mobile receive terminal 10 to the selected channel through the input-output device (speaker/display screen) 22. Subsequently, the action planning section 11 causes the contents distribution section 20 to change the channel for transmitting weak radio wave to the selected channel (step S12) and to start transmitting the weak radio wave. Thereafter, the robot 100 keeps moving toward the target position (step S16). The determination in step S11 is made both for the channel to transmit the contents for adults and for the channel to transmit the contents for children, and the channel is changed in step S12 as necessary.

When there is no channel not used by the other robot 200 (step S10: No), the action planning section 11 causes the contents delivery region 20 to stop the transmission of the weak radio wave for a predetermined time (e.g., several seconds) in order to avoid interference between weak radio waves (step S13), and the robot 100 keeps traveling in the state where the transmission is stopped. Subsequently, after a lapse of the predetermined time, the action planning section 11 determines whether overlapping between the receivable area of the robot 100 and the receivable area of the other robot 200 is unlikely to occur even if the robot 100 keeps moving on the current path (step S14). For example, when the robot 100 has passed the receivable area of the other robot 200 during the predetermined time, "Yes" is selected in step S14, and the robot 100 keeps traveling toward the target position on the current path (step S16). When overlapping between the receivable area of the robot 100 and the receivable area of the other robot 200 is likely to occur even after a lapse of the predetermined time, "No" is selected in step S14, and the travel control section 14 causes the robot 100 to stop traveling in response to an instruction provided by the action planning section 11 so that the robot 100 comes to a halt for a time (step S15). Subsequently, until a situation that allows the robot 100 to travel without causing radio interference comes, the above-described series of processes after step S2 are repeated. When the situation that allows the robot 100 to travel without causing radio interference comes, the robot 100 starts traveling toward the target position (step S16).

Until the robot 100 comes near the target position (step S17: No), the series of processes after step S2 are repeated. When the robot 100 comes near the target position (step S17: Yes), the action planning section 11 determines whether the other robot 200 is around the target position based on the position information and the status information of the other robot 200 transmitted from the robot management server 30 illustrated in FIG. 1 (step S18). Here, specifically, whether the robot 100 is near the target position is determined through the determination by the action planning section 11 as to whether a distance from the current position of the robot 100 to the target position is within a predetermined approaching distance. Meanwhile, whether the other robot 200 is around the target position is determined by judging whether the other robot 200 is at a position near the target position to an extent that the receivable area of the robot 100 where the robot 100 is assumed to be at the target position overlaps the current receivable area of the other robot 200.

When no other robot 200 is around the target position (step S18: No), it is subsequently determined whether the target position is a guide position (step S24). At this stage, a guide position 304 of the exhibit B in FIG. 2 is set as a target position and thus, "Yes" is selected in step S24. The robot 100 then proceeds to the guide position 304 serving as the target position. Subsequently, in a state of being at a halt in the guide position 304, the robot 100 transmits the contents of a detailed explanation of the exhibit B to the mobile receive terminals 10 of the customers around the robot 100 (step S30). At this point, the customer is able to receive the detailed explanation of the exhibit B by means of both image and voice through the display screen and the earphone of the mobile receive terminal 10.

On the other hand, when there is the other robot 200 around the target position (step S18: Yes), radio interference with the other robot 200 is likely to occur if the robot 100 keeps proceeding to the target position along the current path. For example, when, as illustrated in FIG. 2, the other robot 200 is present at the guide position 302, it is necessary to take an action for avoiding the other robot 200.

Here, in the exhibition illustrated in FIG. 2, as an area where the customer is allowed to receive the detailed explanation of an exhibit while closely looking at the exhibit, a guide area is provided around each exhibit. Within this guide area, two or more guide positions are provided as stopping positions where the robot of this guide system comes to a halt to give a detailed explanation of the exhibit. This guide area is an example of the guide location of the present invention. A guide area 310 of the exhibit B is illustrated in FIG. 2. The guide position 302 set as the target position of the robot 100 is one of the guide positions that exit within this guide area 310. Besides the guide position 302, there is another guide position 304 on the left of the guide position 302.

When there is the other robot 200 around the target position (step S18: Yes), the action planning section 11 determines whether a guide position where the receivable area of the robot 100 is unlikely to overlap the receivable area of the other robot 200 exists within the guide area 310, even if the size of the receivable area of the robot 100 (i.e., intensity of the current weak radio wave) is maintained (step S19). For example, in FIG. 2, the receivable area 100a of the robot 100 does not overlap the receivable area 200a of the other robot 200 at the guide position 304 located on the left of the guide position 302 that is the target position of the robot 100 (step S19: Yes). In this situation, the action planning section 11 sets, in stead of the guide position 302 that is the current target position, the guide position 304 on the left of the guide position 302 as a new target position (step S23), and repeats the processes after step S2 described above for the set new target position. Incidentally, the situation illustrated in FIG. 2 is an example where only a single other robot 200 is present within the guide area 310. However, when two or more other robots 200 are present within the guide area 310, it is determined whether there is a guide position that does not overlap the receivable area of any of the other robots 200 in step S19.

When it is determined that a guide position where the receivable area of the robot 100 is unlikely to overlap the receivable area of the other robot 200 does not exist within the guide area 310 if the size of the intensity of the current weak radio wave of the robot 100 is maintained (step S19: No), the action planning section 11 subsequently checks if the action planning section 11 is able to find a guide position where the receivable area of the robot 100 is unlikely to overlap the receivable area of the other robot 200, by weakening the intensity of the weak radio wave currently used by the robot 100 to a predetermined level, thereby narrowing the receivable area (step S20). When the guide position that is likely to avoid overlapping with the receivable area of the other robot 200 by narrowing the receivable area is found (step S20: Yes), the intensity of the weak radio wave is weakened to a predetermined level (step S21), and the found guide position is set as a new target position (step S23). Subsequently, the processes after step S2 described above are repeated. On the other hand, when the guide position that is likely to avoid overlapping with the receivable area of the other robot 200 is not found even if the receivable area is narrowed (step S20: No), a predetermined standby position 303 illustrated in FIG. 2 is set as a new target position (step S22), and the processes after step S2 described above are repeated. In this guide system, each guide robot is provided with a standby position where the robot stays when the robot is unable to enter the guide area, thereby preventing occurrence of a situation where the robot is unable to enter a standby position because of existence of other robot. Therefore, when the predetermined standby position 303 is set as a new target position and the processes after step S2 are repeated, "No" is always selected in step S18. Further, it is determined that the target position is not a guide position in step S24. Then, the robot 100 proceeds to the standby position 303 and enters a standby state in this position (step S25). Here, this standby position 303 is deviated from the traveling path of the other robot 200, thereby avoiding radio interference with the other robot 200. While the robot 100 stays in the standby position 303, the contents for waiting time are transmitted to the customers in FIG. 1.

When the robot 100 is at this standby position, the action planning section 11 determines whether a guide position that is unlikely to overlap the receivable area of the other robot 200 exists within the guide area 310, even if the intensity of the current weak radio wave of the robot 100 is maintained (step S26). When such a guide position exists, this guide position is set as a new target position (step S23), and the robot 100 proceeds to the guide position (step S29). Incidentally, when the robot proceeds from the standby position to the guide position, transmission of the contents is stopped. For this reason, the robot 100 is able to move to the guide position without going through the processes after step S2. Subsequently, during a halt at the guide position, the robot 100 transmits the contents representing the detailed explanation of the exhibit B to the mobile receive terminals 10 of the customers around the robot 100 (step S30). When a guide position that is unlikely to overlap the receivable area of the other robot 200 does not exist within the guide area 310 if the intensity of the current weak radio wave of the robot 100 is maintained (step S26: No), the action planning section 11 subsequently checks whether it is possible to find a guide position unlikely to overlap the receivable area of the other robot 200 by weakening the intensity of the weak radio wave currently used by the robot 100 to a predetermined level, thereby narrowing the receivable area (step S27). When a guide position that avoids overlapping with the receivable area of the other robot 200 is found by narrowing the receivable area (step S27: Yes), the intensity of the weak radio wave is weakened to a predetermined level (step S28), and the found guide position is set as a new target position. Subsequently, the robot 100 proceeds to the set guide position, and transmits the contents that present the detailed explanation of the exhibit B to the mobile receive terminals 10 of the customers around the robot 100 (step S30). On the other hand, when a guide position that avoids overlapping with the receivable area of the other robot 200 is not found even if the receivable area is narrowed (step S27: No), the flow goes back to step S25 and the robot 100 remains in the standby state. Finally, when entering a situation in which no radio interference occurs, the robot 100 transmits the contents that present the detailed explanation on the exhibit B.

The robot 100 acts in the above-described manner, before providing the detailed explanation of the exhibit B. After completing the detailed explanation of the exhibit B, the robot 100 then repeats the processes illustrated in FIGS. 3A-3D for the exhibit C to give the detailed explanation of the exhibit C to the customers.

As described above, when providing the detailed explanation beside the exhibit, the robot 100 prevents the occurrence of radio interference by taking an action such as: moving so as to avoid overlapping with the receivable area of the other robot 200; narrowing the receivable area by weakening the intensity; or waiting until overlapping between the receivable areas is resolved. Further, it is contrived to prevent the occurrence of radio interference by changing the channel while the robot 100 is traveling, even if two or more robots exist.

Here, at the time of providing the detailed explanation at a guide position, an action to avoid overlapping with the receivable area of the other robot 200 is taken as described above, instead of changing the channel. The reason for taking such an action is that because the periphery of the exhibit is very likely to be crowded with the robots, a situation where the number of channels is insufficient or changing of the channel is too late may occur easily. However, occurrence of such a situation is rare when the number of channels is equal to or larger than the number of robots. Therefore, in the present invention, there may be adopted a robot that carries out, in addition to taking the action for avoiding overlapping between the receivable areas, changing of the channel.

The structure of such a robot is the same as the structure of the robot 100 illustrated in FIG. 1. Also, the flowchart of the actions of such a robot is a flowchart where determination in step S10, determination in step S11, and changing of the channel in step S12 exist after "No" is selected in step S19 in FIGS. 3A-3D. In such a flowchart, when it is impossible to change the channel and thus to avoid radio interference by changing the channel (the case where "No" is selected in the determination in step S10 added), an action to avoid an overlap between the receivable areas after step S20 in the flowchart in FIGS. 3A-3D is taken. On the other hand, when it is possible to avoid radio interference by using a channel different from that used by the other robot (when going through steps S11 and S12 added), the flow directly proceeds to the process after step S23. Except for these three new steps added, the actions of this robot are the same as those of the robot 100 described earlier and also, the contents of step S10 through S12 in FIG. 3B have been already described above. Therefore, redundant description of these added steps is omitted.

Also, in the above-described example, through the robot management server illustrated in FIG. 1, information is exchanged between the robots. However, the robot of the present invention may directly exchange the position information and the status information between the robots. For example, the robot may have IP addresses of the other robots and exchange information through a wireless LAN using these IP addresses. Alternatively, the robot may be provided with RF-ID or the like, thereby detecting the other robot present within a certain own range and obtaining information about the robot.

Also, in the above-described example, the robot transmits the contents to the mobile receive terminal 10 after acquiring the contents from the contents distribution server 40. However, in the robot of the present invention, the contents of each exhibit may be stored beforehand in a hard disk drive or the like within the robot so that the stored contents may be transmitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A robot comprising:
a moving mechanism;
a position recognition section that recognizes a current position of the robot within a guide zone having at least one guide location;
a movement control section that moves the robot to each of guide locations in the guide zone by using the moving mechanism, while causing the position recognition section to recognize the current position; and
a transmission section that transmits, every time the robot moves to each of the guide locations, contents information corresponding to the guide location to a mobile receive terminal held by a person to be guided near the robot,
wherein the transmission section transmits a weak radio wave receivable only in a region around the robot where the person to be guided by the robot is assumed to be present,
wherein the position recognition section recognizes the current position of the robot, and also recognizes a current position of other robot movable and independent of the robot, when the other robot, which transmits a weak radio wave receivable only in a region around the other robot where a person to be guided by the other robot is assumed to be present, is within the guide zone,
the movement control section moves, when there is the other robot in one of the guide locations to which the movement control section intends to move the robot, the robot to a position being in the guide location and avoiding radio interference with the weak radio wave transmitted by the other robot, and
the transmission section transmits, in a state in which the robot is at the position after moved to the position, contents information corresponding to the guide location.

2. A robot comprising:
a moving mechanism;
a position recognition section that recognizes a current position of the robot within a guide zone having at least one guide location;
a movement control section that moves the robot to each of guide locations in the guide zone by using the moving mechanism, while causing the position recognition section to recognize the current position; and
a transmission section that transmits, every time the robot moves to each of the guide locations, contents information corresponding to the guide location to a mobile receive terminal held by a person to be guided near the robot,
wherein the transmission section transmits a weak radio wave receivable only in a region around the robot where the person to be guided by the robot is assumed to be present,
wherein the position recognition section recognizes the current position of the robot, and also recognizes a current position of other robot movable and independent of the robot, when the other robot, which transmits a weak radio wave receivable only in a region around the other robot where a person to be guided by the other robot is assumed to be present, is within the guide zone,
the transmission section is capable of increasing and reducing the region where the weak radio wave is receivable, by changing intensity of the weak radio wave, and
the transmission section transmits, when there is the other robot in one of the guide locations to which the movement control section intends to move the robot, the contents information, by making the intensity of the weak radio wave weaker than the intensity of a situation where the other robot is absent in the guide location.

3. A robot comprising:

a moving mechanism;

a position recognition section that recognizes a current position of the robot within a guide zone having at least one guide location;

a movement control section that moves the robot to each of guide locations in the guide zone by using the moving mechanism, while causing the position recognition section to recognize the current position; and a transmission section that transmits, every time the robot moves to each of the guide locations, contents information corresponding to the guide location to a mobile receive terminal held by a person to be guided near the robot, wherein the transmission section transmits a weak radio wave receivable only in a region around the robot where the person to be guided by the robot is assumed to be present, wherein the mobile receive terminal receives a signal of any selected from a plurality of channels between which radio interference is avoided, the position recognition section recognizes the current position of the robot, and also recognizes a current position of other robot movable and independent of the robot, when the other robot, which transmits by using any of the plurality of channels a weak radio wave receivable only in a region around the other robot where a person to be guided by the other robot is assumed to be present, is within the guide zone, the robot further comprises:

a channel determination section that recognizes a channel used by the other robot and determines whether the recognized channel is same as a channel currently used by the robot; and an overlap detection section that detects that at least part of the region where the person to be guided by the other robot is assumed to be present overlaps the region where the person to be guided by the robot is assumed to be present, and when the channel determination section determines that the recognized channel used by the other robot is the same as the channel currently used by the robot and the overlap detection section detects that at least part of the region where the person to be guided by the other robot is assumed to be present overlaps the region where the person to be guided by the robot is assumed to be present, the transmission section transmits the contents information by using, in stead of the channel currently used by the robot, a channel different from the channel currently used by the robot among the plurality of channels.

* * * * *